United States Patent [19]

Lemburg

[11] Patent Number: 5,704,655
[45] Date of Patent: Jan. 6, 1998

[54] ANTI-THEFT HOSE LOCK

[76] Inventor: Michael Lemburg, 19351 Sunray La. #201, Huntington Beach, Calif. 92648

[21] Appl. No.: 642,279

[22] Filed: May 3, 1996

[51] Int. Cl.[6] ............................................ F16L 35/00
[52] U.S. Cl. ........................................ 285/80; 411/910
[58] Field of Search ................... 285/80, 81; 411/402, 411/427, 432, 910

[56] References Cited

U.S. PATENT DOCUMENTS

| 2,048,424 | 7/1936 | Caldwell | 285/80 X |
| 4,521,146 | 6/1985 | Wharton | 411/910 X |
| 4,826,215 | 5/1989 | Sullivan | 285/80 |
| 4,907,929 | 3/1990 | Johnston | 411/910 X |
| 5,022,561 | 6/1991 | LaGasse et al. | 222/153 |
| 5,269,568 | 12/1993 | Courturier | 285/80 |
| 5,490,693 | 2/1996 | Fisher et al. | 285/81 X |

FOREIGN PATENT DOCUMENTS 2014680  8/1979  United Kingdom ............... 411/910

*Primary Examiner*—John A. Ricci

[57] ABSTRACT

An apparatus is provided for resisting the removal of any or all of the fueling components 12 from a gasoline dispenser 10 that are coupled by a fitting 21 with a nut portion 22. The apparatus includes a pair of inner pieces 26 of suffient width to cover the nut portion 22, and which have an inside edge 28 that fits tightly around the nut portion; and a pair of outer pieces 54 which when fastened together rotatably mount over the inner pieces.

8 Claims, 4 Drawing Sheets

ANTI-THEFT HOSE LOCK

BACKGROUND

1. Field of Invention

This invention relates to anti-theft devices, specifically to such devices which are used to resist the theft of fueling components such as fuel dispensing nozzles, hoses, and breakaway apparatus used in gas stations.

2. Description of Prior Art

Fuel dispensing nozzles used in gas stations are typically connected to hoses by a ferrule fixed to one end of the hose and a fitting which couples the ferrule to the rear end of the nozzle. The other end of the hose is similarly coupled directly to the gas dispenser, or to a breakaway device which couples to a short whip-hose, then to the gas dispenser. The fitting is rotatably mounted on the ferrule, has a nut portion that can be grasped by a large wrench to turn the fitting, and has threaded ends that on one end thread into a hole at the rear of the nozzle, and at the other end into one-half of the breakaway, or into the gas dispenser. Thieves often drive up to a gas station with a large wrench in hand and unscrew the fittings to steal the nozzle or the entire fueling component assembly. It may take perhaps 5 seconds to remove each nozzle/hose assembly. The thieves typically drive off before personnel realize what has happened.

Inventors have created several types of locks to resist such thefts. One example is U.S. Pat. No. 5,022,561 to La Gasse (1991) which discloses a lock that attaches to the ferrule and covers the nut to prevent rapid removal of a gasoline-dispensing nozzle; however, this lock is bulky because it has to be big enough to cover the ferrule and the nut. This lock also is initially difficult to install because the nozzle has to be removed from the hose and, the gasoline has to be carefully drained out of the hose. This is awkward and time consuming for the maintenance service personnel, and can be environmentally unfriendly if the gas is not handled properly. Finally, thieves can quietly and easily slip the lock off the ferrule, exposing the nut, simply by loosening two or three short screws with an ordinary hex wrench.

Another example is U.S. Pat. No. 4,826,215 to Sullivan (1989) which discloses a lock that includes a pair of pivotally-connected halves that can be closed around a coupling and which carry a hasp that can receive an ordinary padlock. However, this device makes the rear of the nozzle, which is often held by customers during dispensing of gasoline, more difficult to hold because of its bulk and the dangling padlock. The loose padlock can cause damage to a vehicle by banging into it during fueling, and can easily catch on customers' hands, clothing, and jewelry. Also thieves can carry bolt cutters which can be used to cut a padlock in a few seconds.

All the anti-theft locks heretofore known suffer from one or more of the following disadvantages:

(a) The locks in present use are large in size in order to cover the ferrule and nut. This size requirement makes them heavy. They are also usually made of some type of metal which inherently adds to the weight of the lock.

(b) Locks that require the removal of the nozzle in order to be put on the hose are inconvenient to install.

(c) Locks made of metal are expensive to machine or mold, and the designs to date have been obvious post-factory additions to the fueling components.

(d) Locks with loose, dangling parts are unsightly as well as a hazard to customers and their vehicles.

(e) The screws holding the locks in place can be quickly loosened, thereby enabling the lock to be slipped off the ferrule, exposing the nut for removal of the fueling components.

OBJECTS AND ADVANTAGES

Accordingly, several objects and advantages of the present invention are:

(a) to provide an anti-theft device which is small and lightweight;

(b) to provide an anti-theft device which is simple to use, and which can be installed without removing the nozzle or hose;

(c) to provide an anti-theft device which is inexpensive to manufacture, and whose design and color make the lock inconspicuous by coordinating with the exisitng fueling components;

(d) to provide an anti-theft device which has no bulky or dangling parts; and (e) to provide an anti-theft device which is time consuming for a thief to remove.

Further objects and advantages will become apparent from a consideration of the ensuing description and drawings.

DRAWING FIGURES

Figure 1:
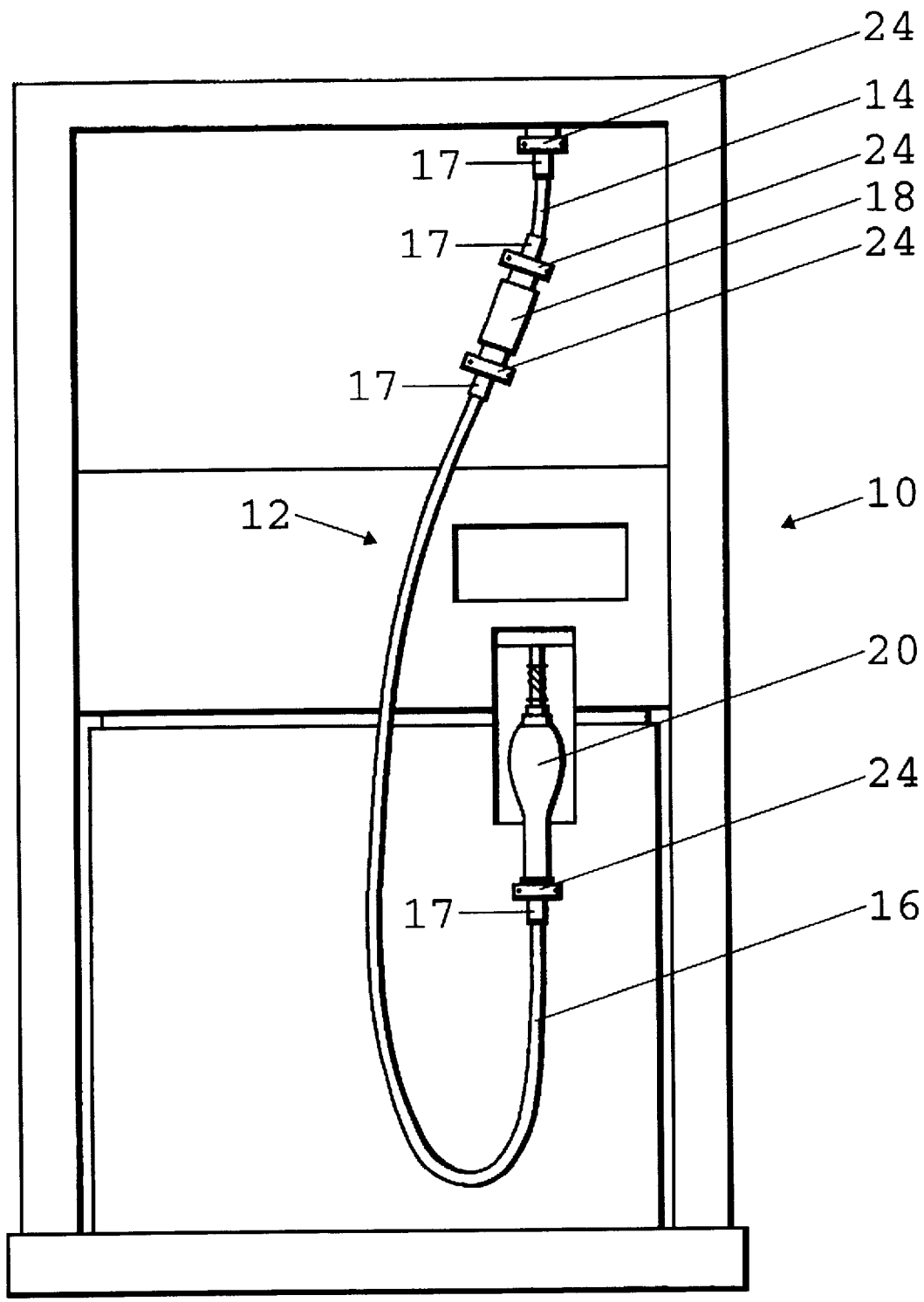
FIG. 1 is a view of an existing fueling component assembly which includes a nozzle, a hose with attached ferrules, a breakaway, a whip-hose with attached ferrules, and a gasoline dispenser assembly. Also shown is the anti-theft apparatus of the present invention in place.

| Reference Numerals in Drawings | |
|---|---|
| 10 existing gasoline dispenser | 12 existing fueling components |
| 14 existing whip-hose | 16 existing main hose |
| 17 existing ferrule | 18 existing breakaway |
| 20 existing nozzle | 21 existing fitting |
| 22 existing nut portion | 23 existing threaded end |
| 24 anti-theft apparatus | 26 inner piece |
| 28 inside edge of inner piece | 30 inner pin |
| 32 inner pin-hole | 34 screw |
| 36 screwhead | 38 nut |
| 40 inner screw-hole | 42 inner screwhead placement area |
| 44 inner nut placement area | 46 inside track |
| 48 outside edge of inner piece | 50 edges of inside track |
| 52 edges of inside track | 54 outer piece |
| 56 outer pin | 58 outer pin-hole |
| 60 tamper-proof screw | 62 screwhead |
| 64 lock-nut | 65 plastic insert |
| 66 outer screw-hole | 68 outer screwhead placement area |
| 70 outer nut placement area | 72 outside track |
| 74 edges of outside track | 76 edges of outside track |
| 78 inside edge of outer piece | |

DESCRIPTION

FIGS. 1–5

Figure 5:
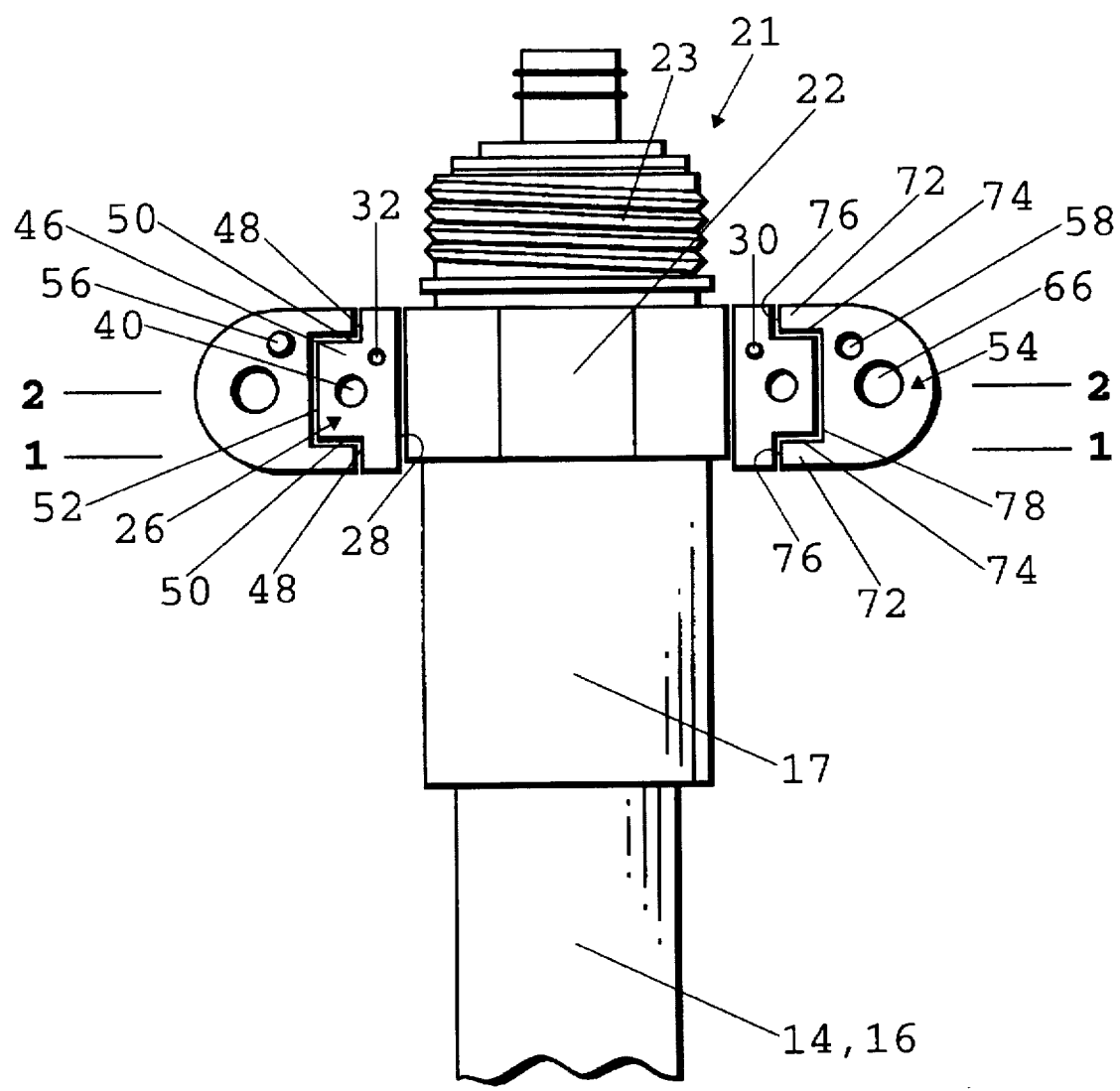
FIG. 5 is a side view of an existing hose which has a fitting with a nut portion, and a side view of the anti-theft apparatus in place.

FIG. 1 illustrates a gasoline dispenser 10, and a fueling component 12 assembly of the prior art which includes a nozzle 20, a hose 16 with a ferrule 17 rigidly attached to both ends, a fitting 21 (FIG. 5) rotatably mounted on each ferrule, a breakaway 18, and a whip-hose 14 with ferrules 17 and fittings 21 (FIG. 5). The anti-theft apparatus 24 of the present invention is also shown in place covering each of the fueling components 22 (FIG. 5) of the fittings 21 where the fueling components can be separated from each other or from the gasoline dispenser. When any of the fueling components need to be replaced, they can be removed by turning the nut portion of the fitting to unscrew the threaded end 23 of the fitting.

Figure 2:
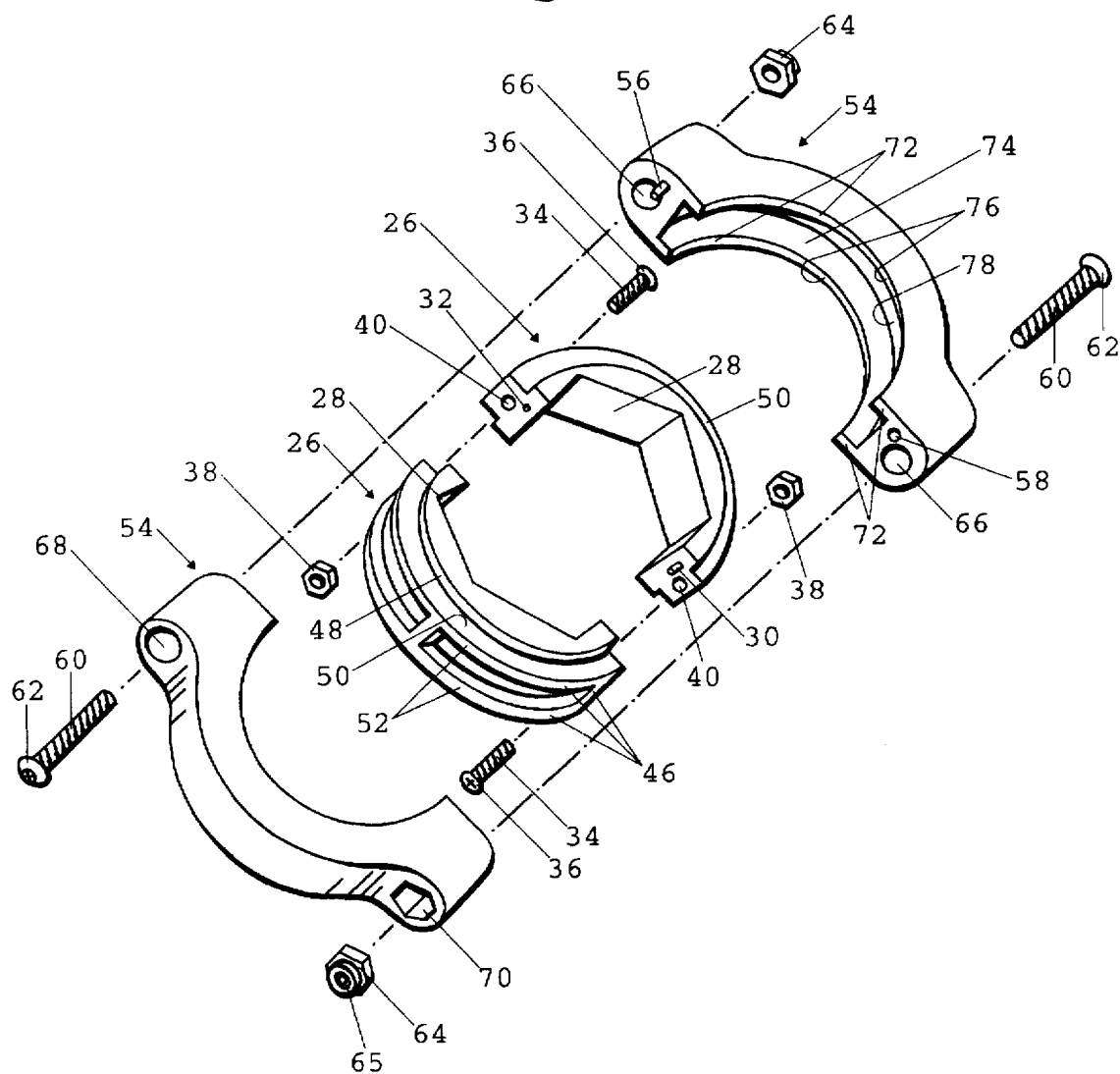
FIG. 2 is a perspective and exploded view of the anti-theft apparatus of the present invention.
Figure 4:
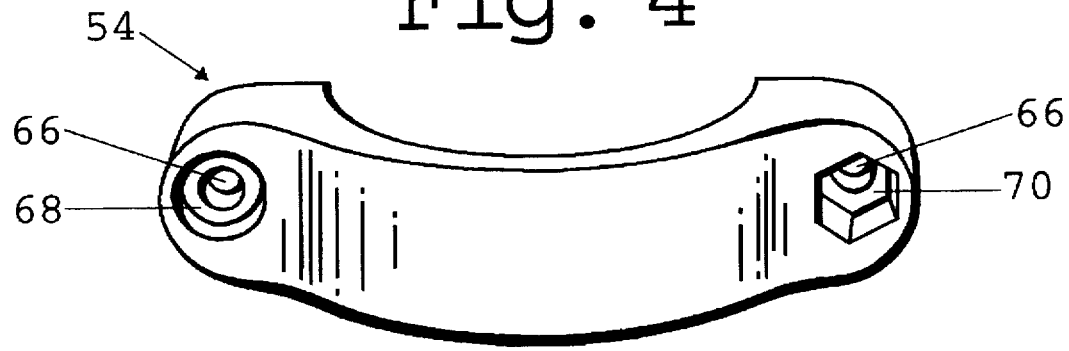
FIG. 4 is a side view of the outer piece of the anti-theft apparatus.
Figure 4A:
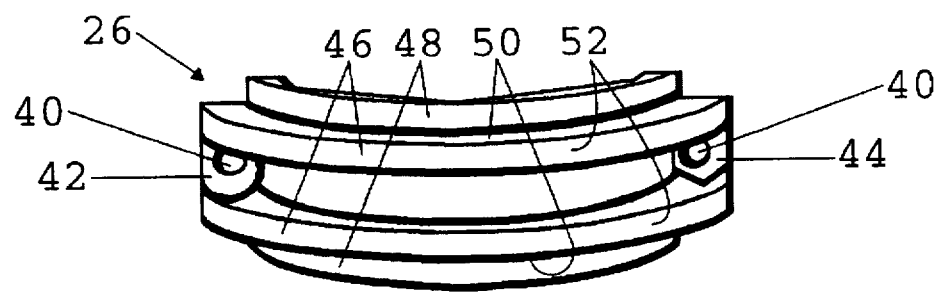
FIG. 4a is a side view of the inner piece of the anti-theft apparatus.

A typical embodiment of the anti-theft apparatus 24 of the present invention shows a simple, low cost design which is effective in preventing thefts that occur during a short period of time. As shown in FIG. 2, the apparatus includes an identical pair of inner pieces 26 with a width great enough to cover the nut portion 22 of the fitting, and with an inside edge 28 shaped to fit tightly around the nut portion of the fitting (FIG. 5). The inner pieces fasten together around the nut portion, so that the pin 30 inserts into the pinhole 32 opposite it which allows the screw-holes 40 to align for easier and more acccurate assembly. The screws 34 slip into the screw-holes, and turn into the nut 38, thereby connecting the two inner pieces around the nut portion of the fitting. As the screw tightens, it pulls the nut into the nut placement area 44 (FIG. 4a) while the screwhead 36 presses into the screwhead placement area 42 (FIG. 4a).

Figure 3:
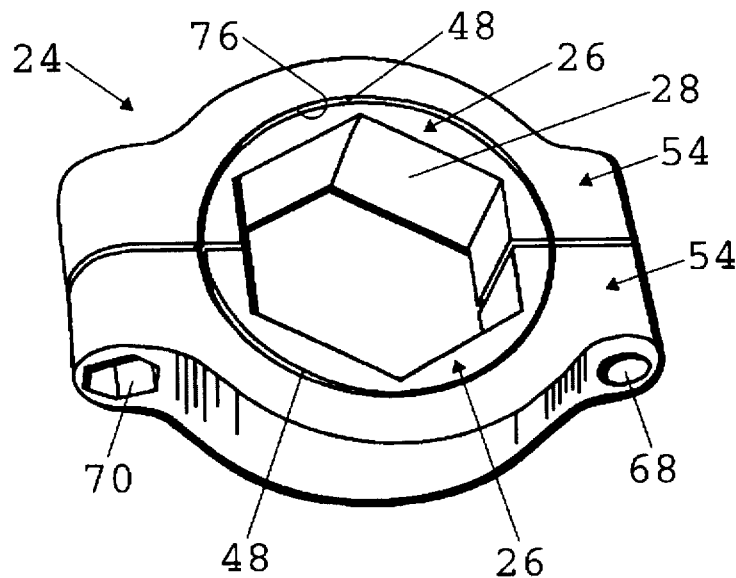
FIG. 3 is a top view of the assembled anti-theft apparatus.

The two identical outer pieces 54 (FIG. 2) have an outside track 72 that fits over the inside track 46 located on the inner pieces 26. The outer pieces fasten together over the inner pieces so that the pin 56 inserts into the pinhole 58 opposite it which allows the screw-holes 66 to align for easier and more accurate assembly. The tamper-proof screws 60 slip into the screw-holes and turn into the lock-nut 64, thereby surrounding the inner pieces with the two outer pieces. As the tamper-proof screw tightens, it pulls the lock-nut into the nut placement area 70 while the screwhead 62 presses into the screwhead placement area 68 (FIG. 4). The edges 76,78 of the outer piece have a slightly larger diameter than the edges 48,52 of the inner piece, and edge 74 of the outer piece has a larger width than edge 50 of the inner piece, so that when the outer pieces are in place they surround, but do not grip the inner pieces, and can freely rotate around the inner pieces (FIG. 3).

The anti-theft apparatus 24 can be molded or machined, and can be made from any hard substance, such as plastic or metal. In the prefered embodiment, the apparatus is molded with an extra-strong nylon plastic mixed with 50% glass. This metal-replacing plastic is virtually unbreakable yet very lightweight. The plastic is pigmented black so that it coordinates with the existing fueling components and is inconspicuous to customers.

The outer pieces 54 (FIG. 2) are held together with tamper-proof screws 60 and lock-nuts 64. These screws have a head 62 design which require a special screwdriver that is not as readily available as an ordinary flathead or philips screwdriver, thereby creating an additional obstacle for the thief to overcome. The lock-nuts have a plastic insert 65 against the threads which make the tightening or loosening of the screws more difficult and time consuming. The inner pieces 26 are held together with philips-head screws 34 and small pattern nuts 38. This change in hardware types requires the thief to carry an additional tool, and to have to change tools, which again adds time to the removal of the anti-theft apparatus. However, there are various possibilities with regard to holding the pieces together such as, different screw and nut combinations, as well as cam-locks, padlocks, locking-bolts, etc. The screws and nuts which hold the outer pieces together are encased by the screwhead placement area 68 and the nut placement area 70. This feature denies access to the screw or nut except by the insertion of the specific tamper-proof screw tool directly into the screwhead 62. This feature also adds to the solid feel of the lock, helps protect the screws and nuts from the weather, and keeps any loose parts or sharp edges away from customers' hands and property.

The width of the anti-theft appartus 24 (FIG. 3) is 0.75 inches. The inside edges 28 create a hexagon shape which has an edge to edge measurement of 1.5 inches, and which fits tightly around the nut portion 22 of existing Goodyear and Dayco vac-assist hoses. However, the size and shape of the inside edge of the inner piece, and the overall diameter and the width of the pieces 26,54 can be modified to fit any size or style of nut. The outside diameter of the inner pieces 26 taken on line 1—1 (FIG. 5) is 1.875 inches. The inside diameter of the outer pieces 54 taken on line 1—1 (FIG. 5) has a clearance of only about ten-thousandths of an inch from the outside diameter of the inner pieces so that the outer pieces rotate around the inner pieces, but not too loosely. As a result, the anti-theft apparatus still has a solid feel and does not create the impression of being sloppy. The outside dimension of the outer pieces taken on line 2—2 (FIG. 5) is 3.25 inches. This dimension is primarily relative to the size and type of hardware used to hold the pieces together. The overall size of the apparatus can be adapted as necessary to fit the nut portion 22 of the fitting 21 and to house any variety of hardware.

Also shown in FIG. 3, each inner and outer piece 26,54 covers no more than 180° of the nut portion of the fitting. This allows for easy installation since the hose 14,16 (FIG. 1) does not have to be unscrewed from the nozzle 20, breakaway 18, or dispenser 10 to install the apparatus.

OPERATIONS

FIGS. 1, 3 and 5

There is expected to be a high rate of theft of the vac-assist type of fueling components 12 illustrated in FIG. 1. A thief commonly drives up to the island of a gas station, where there may be several hose/nozzle assemblies 12. The thief quickly applies a wrench to the nut portion 22 (FIG. 5) of the fitting 21 to unscrew it and steal the nozzle 20 (FIG. 1), or the entire assembly 12. The whole operation may take perhaps 5 seconds for each hose/nozzle system. The thief then quickly drives away. Because of the short time required to remove a nozzle and the fact that a thief may appear to be a customer at a self-service gas pump, gas station attendants may not notice a theft when it is in progress.

While it is desirable to provide anti-theft apparatus, it is preferable that such apparatus be of low cost. It is also desirable that any such anti-theft apparatus not add too much weight to the region near the nozzle because customers lift and hold this region while dispensing gasoline. It is also desirable that the apparatus not detract from the appearance of the fueling component assembly, and not have any hazardous loose or dangling parts.

The manner of using the anti-theft apparatus 24 (FIG. 3) of the present invention is to tighten the inner pieces 26 over the nut portion 22 (FIG. 5) of the fitting 21, and then to tighten the outer pieces 54 (FIG. 3) over the inner pieces. The anti-theft apparatus is of sufficient width to cover the nut portion of the fitting so that the nut itself cannot be grasped with a wrench. If the thief applies a wrench to the anti-theft apparatus, the outer pieces will turn without loosening the inner pieces or the nut portion of the fitting. This is because, while the inner pieces are tightly clamped to the nut portion of the fitting, the outer pieces sandwich the inside pieces, but are not clamped to them, which allows the outer pieces to freely rotate around the inner pieces.

In addition, the outside track 72 (FIG. 2) of the outer piece and the inside track 46 of the inner piece are of sufficient diameter that both outside screws 60 have to be completely unscrewed from the nuts 64, not just loosened, in order for the outside pieces to be removed, thereby exposing the inner pieces which tightly sandwich the nut portion 22 (FIG. 5) of the fitting. It is still difficult to grasp the inner pieces with a wrench to loosen the protected nut portion, so the thief now has to change tools to loosen the screws 34 (FIG. 2) so that the inner pieces will slip off the nut portion. In practice, this process requires about 30 seconds. This period of time and the need to handle two screwdrivers and a large wrench, make the unobserved theft of fueling components much more difficult, thereby effectively providing an anti-theft apparatus for resisting the rapid removal of fueling components. It is an added benefit to maintenance service personnel that the nozzle and hose can remain intact during the installation of the anti-theft apparatus. The inner pieces 26 fit so tightly together around the nut portion that if a thief tries to pound the anti-theft apparatus 24 (FIG. 3) off the nut portion the pounding would make so much noise that the thief becomes obvious, just like the thief who breaks a window to steal a car.

SUMMARY, RAMIFICATIONS, AND SCOPE

Accordingly, the reader will see that the anti-theft apparatus of this invention provides a small and lightweight device for resisting the removal of fueling components, which is easy to install, yet time consuming for a thief to remove; which is simple to manufacture; which enhances the look of the existing fueling components; and which has no loose or exposed parts that can hurt customers or their property.

Although the description above contains many specificities, these should not be construed as limiting the scope of the invention but as merely providing illustrations of some of the presently preferred embodiments of this invention. For example, the lock can be other shapes and sizes; the inside edge can be other shapes and sizes; there can be one or more inside tracks; the pieces do not have to be identically shaped; there can be more than two inner and/or two outer pieces; the inner pieces can be of a different material than the outer pieces; the pieces can be machined instead of molded; the nuts can be molded into the lock, or the pieces can have threaded holes so that no separate nut is needed; the plastic can be pigmented to match any existing color scheme; etc.

Thus the scope of the invention should be determined by the appended claims and their legal equivalents, rather than by the examples given.

I claim:

1. Anti-theft apparatus for resisting the removal of fueling components from one another wherein said fueling components are coupled by a fitting with a nut portion, and wherein removal of said fueling components is normally accomplished by unscrewing said fitting, comprising:

a plurality of inner pieces having a width large enough to cover said nut portion;

said inner pieces each having an inside edge which when fastened together press firmly around said nut portion;

a plurality of outer pieces having a width large enough to cover said inner pieces;

said outer pieces each having an inside edge which when fastened together over said inner pieces rotate around said inner pieces.

2. The anti-theft apparatus of claim 1 for resisting the removal of said fueling components from a gasoline dispenser.

3. The anti-theft apparatus of claim 1 for resisting the removal of a fuel dispensing nozzle from a hose.

4. The anti-theft apparatus of claim 1 for resisting the removal of a fuel dispensing hose from a breakaway.

5. The anti-theft apparatus of claim 1 for resisting the removal of a fuel dispensing breakaway from a hose.

6. The anti-theft apparatus of claim 1 for resisting the removal of a fuel dispensing hose from a fuel dispenser.

7. An anti-theft device for deterring the unauthorized detachment of fuel dispensing components from a fuel dispenser wherein said fuel dispensing components are coupled by a fitting with a nut portion, and wherein detachment of said fuel dispensing components is normally accomplished by unscrewing said fitting, comprising:

a plurality of inner pieces having a width large enough to cover said nut portion;

said inner pieces each having an inside edge which when fastened together press firmly around said nut portion;

a plurality of outer pieces having a width large enough to cover said inner pieces;

said outer pieces each having an inside edge which when fastened together over said inner pieces rotate around said inner pieces.

8. The anti-theft device of claim 7 for deterring the unauthorized detachment of said fuel dispensing components from one another.

* * * * *